US00RE44211E

(19) United States
(12) Reissued Patent
Lin et al.

(10) Patent Number: US RE44,211 E
(45) Date of Reissued Patent: May 7, 2013

(54) CONSTANT BIT RATE TRANSPORT IN A CONTENTION BASED MEDIUM ACCESS CONTROL

(75) Inventors: Bouchung Lin, Taipei (TW); Francis R. Koperda, Dawsonville, GA (US)

(73) Assignee: Scientific-Atlanta, LLC, Lawrenceville, GA (US)

(21) Appl. No.: 10/965,711

(22) Filed: Oct. 14, 2004

Related U.S. Patent Documents

Reissue of:
(64) Patent No.: 6,467,091
Issued: Oct. 15, 2002
Appl. No.: 09/294,756
Filed: Apr. 19, 1999

U.S. Applications:
(60) Provisional application No. 60/005,747, filed on Oct. 20, 1995.

(51) Int. Cl.
*H04N 7/173* (2006.01)
*H04N 7/10* (2006.01)
*H04N 5/445* (2011.01)

(52) U.S. Cl.
USPC ..... 725/105; 725/126; 370/414; 370/443; 370/444

(58) Field of Classification Search ..... 725/105, 725/126; 370/414, 444, 395.4, 395.43, 443, 370/445, 468, 442, 458, 345.21
See application file for complete search history.

(56) References Cited

U.S. PATENT DOCUMENTS 4,186,380 A 1/1980 Edwin et al. ..... 340/147
4,207,431 A 6/1980 McVoy ..... 179/1
4,361,851 A 11/1982 Asip et al. ..... 358/84
4,429,383 A * 1/1984 Finick et al. ..... 370/84
4,475,123 A 10/1984 Dumbauld et al. ..... 358/114
4,491,983 A 1/1985 Pinnow et al. ..... 455/612
4,528,589 A 7/1985 Block et al. ..... 358/122
4,536,791 A 8/1985 Campbell et al. ..... 358/122
4,550,398 A * 10/1985 Belforte et al. ..... 370/361
4,577,224 A 3/1986 Ost ..... 358/114

(Continued)

OTHER PUBLICATIONS

PPP Bridging Control Protocol (BCP); F. Baker et al.; Network Working Group Request for Comments, Jun. 1994; pp. 1-28.

*Primary Examiner* — Pankaj Kumar
*Assistant Examiner* — Reuben M Brown
(74) *Attorney, Agent, or Firm* — Merchant & Gould

(57) ABSTRACT

In a two way cable system that includes a controller and a plurality of user terminals, a method of granting rights for upstream data transmission from the user terminals includes processing contention requests to generate contention grants and maintaining a list of connections, each connection having specified therefor a predetermined bit rate. The controller sends a downstream data stream to the user terminals and receives an upstream data stream from the user terminals. The downstream data stream includes a plurality of grant fields, and the upstream data stream includes upstream data slots and upstream control slots. The method further includes scheduling preemptive grants for upstream data slots using selected fields of the plurality of grant fields so as to provide preemptive grants for upstream data transport at a bit rate specified for each connection, sending to the user terminals a data transmission grant in a grant field of the plurality of grant fields for which a preemptive grant is scheduled, and sending to the user terminals a data transmission grant in a grant field of the plurality of grant fields in which a contention grant is pending and no preemptive grant is scheduled.

146 Claims, 4 Drawing Sheets

U.S. PATENT DOCUMENTS

| | | | | | |
|---|---|---|---|---|---|
| 4,601,028 | A | | 7/1986 | Huffman et al. | 370/15 |
| 4,672,533 | A | | 6/1987 | Noble et al. | 364/200 |
| 4,771,391 | A | | 9/1988 | Blasbalg | 364/514 |
| 4,804,248 | A | | 2/1989 | Bhagavatula | 350/96 |
| 4,823,386 | A | | 4/1989 | Dumbauld et al. | 380/13 |
| 4,858,224 | A | | 8/1989 | Nakano et al. | 370/16 |
| 4,912,721 | A | | 3/1990 | Pidgeon, Jr. et al. | 375/1 |
| 5,014,125 | A | | 5/1991 | Pocock et al. | 358/86 |
| 5,047,928 | A | | 9/1991 | Wiedemer | 364/406 |
| 5,050,213 | A | | 9/1991 | Shear | 380/25 |
| 5,113,499 | A | | 5/1992 | Ankney et al. | 395/325 |
| 5,131,041 | A | | 7/1992 | Brunner et al. | 370/58.2 |
| 5,136,690 | A | | 8/1992 | Becker et al. | 395/161 |
| 5,142,690 | A | | 8/1992 | McMullan, Jr. et al. | 455/6.1 |
| 5,155,590 | A | | 10/1992 | Beyers, II et al. | 358/86 |
| 5,159,592 | A | | 10/1992 | Perkins | 370/85.7 |
| 5,166,930 | A | | 11/1992 | Braff et al. | 370/94.1 |
| 5,166,931 | A | | 11/1992 | Riddle | 370/94.1 |
| 5,181,107 | A | | 1/1993 | Rhoades | 358/86 |
| 5,185,860 | A | | 2/1993 | Wu | 395/200 |
| 5,195,092 | A | | 3/1993 | Wilson et al. | 370/94.2 |
| 5,197,094 | A | | 3/1993 | Tillery et al. | 379/91 |
| 5,208,665 | A | | 5/1993 | McCalley et al. | 358/86 |
| 5,214,390 | A | | 5/1993 | Montreuil | 329/309 |
| 5,226,120 | A | | 7/1993 | Brown et al. | 395/200 |
| 5,235,619 | A | | 8/1993 | Beyers, II et al. | 375/38 |
| 5,239,540 | A | | 8/1993 | Rovira et al. | 370/77 |
| 5,251,324 | A | | 10/1993 | McMullan, Jr. | 455/2 |
| 5,261,044 | A | | 11/1993 | Dev et al. | 395/159 |
| 5,271,041 | A | | 12/1993 | Montreuil | 375/97 |
| 5,276,789 | A | | 1/1994 | Besaw et al. | 395/140 |
| 5,287,351 | A | | 2/1994 | Wall, Jr. | 370/77 |
| 5,295,244 | A | | 3/1994 | Dev et al. | 395/161 |
| 5,327,554 | A | | 7/1994 | Palazzi, III et al. | 395/600 |
| 5,333,183 | A | | 7/1994 | Herbert | 379/112 |
| 5,347,304 | A | | 9/1994 | Moura et al. | 348/12 |
| 5,361,259 | A | | 11/1994 | Hunt et al. | 370/84 |
| 5,384,777 | A | * | 1/1995 | Ahmadi et al. | 370/337 |
| 5,404,505 | A | | 4/1995 | Levinson | 395/600 |
| 5,423,003 | A | | 6/1995 | Berteau | 395/200 |
| 5,423,006 | A | | 6/1995 | Brown et al. | 395/275 |
| 5,436,909 | A | | 7/1995 | Dev et al. | 371/20.1 |
| 5,471,399 | A | | 11/1995 | Tanaka et al. | 364/491 |
| 5,473,599 | A | | 12/1995 | Li et al. | 370/16 |
| 5,481,542 | A | | 1/1996 | Logston et al. | 370/94.2 |
| 5,483,631 | A | | 1/1996 | Nagai et al. | 395/155 |
| 5,504,921 | A | | 4/1996 | Dev et al. | 395/800 |
| 5,515,361 | A | | 5/1996 | Li et al. | 370/15 |
| 5,515,418 | A | | 5/1996 | Yamaguchi et al. | 379/34 |
| 5,517,488 | A | | 5/1996 | Miyazaki et al. | 370/16 |
| 5,517,618 | A | | 5/1996 | Wada et al. | 395/200 |
| 5,530,695 | A | * | 6/1996 | Dighe et al. | 370/232 |
| 5,533,108 | A | | 7/1996 | Harris et al. | 379/201 |
| 5,534,913 | A | | 7/1996 | Majeti et al. | 348/7 |
| 5,535,403 | A | | 7/1996 | Li et al. | 395/800 |
| 5,553,095 | A | | 9/1996 | Engdahl et al. | 375/222 |
| 5,553,287 | A | | 9/1996 | Bailey et al. | 395/650 |
| 5,555,244 | A | * | 9/1996 | Gupta et al. | 370/397 |
| 5,570,355 | A | * | 10/1996 | Dail et al. | 370/352 |
| 5,572,640 | A | | 11/1996 | Schettler | 395/140 |
| 5,586,121 | A | | 12/1996 | Moura et al. | 370/404 |
| 5,594,798 | A | | 1/1997 | Cox et al. | 380/49 |
| 5,604,528 | A | | 2/1997 | Edwards et al. | 348/5.5 |
| 5,608,446 | A | | 3/1997 | Carr et al. | 348/6 |
| 5,610,910 | A | | 3/1997 | Focsaneanu et al. | 370/351 |
| 5,612,959 | A | | 3/1997 | Takase et al. | 370/390 |
| 5,638,374 | A | * | 6/1997 | Heath | 370/322 |
| 5,644,706 | A | | 7/1997 | Ruigrok et al. | 395/185.01 |
| 5,650,994 | A | | 7/1997 | Daley | 370/259 |
| 5,654,746 | A | | 8/1997 | McMullan, Jr. et al. | 348/6 |
| 5,675,732 | A | | 10/1997 | Majeti et al. | 395/200.01 |
| 5,701,465 | A | | 12/1997 | Baugher et al. | 395/610 |
| 5,703,795 | A | | 12/1997 | Mankovitz | 364/514 |
| 5,706,277 | A | | 1/1998 | Klink | 370/220 |
| 5,708,655 | A | | 1/1998 | Toth et al. | 370/313 |
| 5,708,961 | A | | 1/1998 | Hylton et al. | 455/4.2 |
| 5,710,884 | A | | 1/1998 | Dedrick | 395/200.47 |
| 5,712,897 | A | | 1/1998 | Ortel | 379/22 |
| 5,720,025 | A | | 2/1998 | Wilkes et al. | 395/182.04 |
| 5,721,780 | A | | 2/1998 | Ensor et al. | 380/25 |
| 5,724,492 | A | | 3/1998 | Matthews, III et al. | 395/119 |
| 5,729,682 | A | | 3/1998 | Marquis et al. | 395/200 |
| 5,737,311 | A | | 4/1998 | Wyld | 370/227 |
| 5,737,316 | A | | 4/1998 | Lee | 370/248 |
| 5,751,706 | A | | 5/1998 | Land et al. | 370/352 |
| 5,751,707 | A | | 5/1998 | Voit et al. | 370/384 |
| 5,751,971 | A | | 5/1998 | Dobbins et al. | 395/200.68 |
| 5,761,602 | A | | 6/1998 | Wagner et al. | 455/3.1 |
| 5,768,280 | A | | 6/1998 | Way | 370/486 |
| 5,790,548 | A | | 8/1998 | Sistanizadeh et al. | 370/401 |
| 5,790,806 | A | | 8/1998 | Koperda | 395/200.82 |
| 5,793,753 | A | | 8/1998 | Hershey et al. | 370/252 |
| 5,796,718 | A | | 8/1998 | Caterisano | 370/217 |
| 5,799,002 | A | | 8/1998 | Krishnan | 370/234 |
| 5,799,016 | A | | 8/1998 | Onweller | 370/401 |
| 5,805,591 | A | | 9/1998 | Naboulsi et al. | 370/395 |
| 5,805,596 | A | | 9/1998 | Kranzler et al. | 370/445 |
| 5,808,671 | A | | 9/1998 | Maycock et al. | 348/180 |
| 5,808,886 | A | | 9/1998 | Suzuki | 364/133 |
| 5,812,819 | A | | 9/1998 | Rodwin et al. | 395/500 |
| 5,818,845 | A | | 10/1998 | Moura et al. | 370/449 |
| 5,822,319 | A | | 10/1998 | Nagami et al. | 370/392 |
| 5,828,655 | A | | 10/1998 | Moura et al. | 370/236 |
| 5,828,666 | A | | 10/1998 | Focsaneanu et al. | 370/389 |
| 5,835,696 | A | | 11/1998 | Hess | 395/182.08 |
| 5,835,725 | A | | 11/1998 | Chiang et al. | 395/200.58 |
| 5,841,468 | A | | 11/1998 | Wright | 348/6 |
| 5,845,091 | A | | 12/1998 | Dunne et al. | 395/200.7 |
| 5,850,400 | A | * | 12/1998 | Eames et al. | 370/443 |
| 5,859,852 | A | | 1/1999 | Moura et al. | 370/449 |
| 5,881,234 | A | | 3/1999 | Schwob | 395/200.49 |
| 5,881,243 | A | | 3/1999 | Zaumen et al. | 395/200.71 |
| 5,883,901 | A | * | 3/1999 | Chiu et al. | 370/508 |
| 5,884,024 | A | | 3/1999 | Lim et al. | 395/187.01 |
| 5,884,284 | A | | 3/1999 | Peters et al. | 705/30 |
| 5,892,812 | A | | 4/1999 | Pester, III | 379/34 |
| 5,894,479 | A | | 4/1999 | Mohammed | 370/401 |
| 5,898,780 | A | | 4/1999 | Liu et al. | 380/25 |
| 5,903,572 | A | | 5/1999 | Wright et al. | 370/524 |
| 5,905,714 | A | | 5/1999 | Havansi | 370/242 |
| 5,905,736 | A | | 5/1999 | Ronen et al. | 370/546 |
| 5,956,391 | A | | 9/1999 | Melen et al. | 379/114 |
| 5,959,972 | A | | 9/1999 | Hamami | 370/228 |
| 5,999,970 | A | | 12/1999 | Krisbergh et al. | 709/217 |
| 6,018,767 | A | | 1/2000 | Fijolek et al. | 709/218 |
| 6,028,860 | A | | 2/2000 | Laubach et al. | 370/395 |
| 6,032,266 | A | | 2/2000 | Ichinohe et al. | 714/9 |
| 6,049,826 | A | | 4/2000 | Beser | 709/222 |
| 6,052,819 | A | | 4/2000 | Barker et al. | 714/776 |
| 6,055,224 | A | | 4/2000 | King | 370/217 |
| 6,058,421 | A | | 5/2000 | Fijolek et al. | 709/225 |
| 6,065,049 | A | | 5/2000 | Beser et al. | 709/218 |
| 6,070,246 | A | | 5/2000 | Beser | 713/201 |
| 6,073,178 | A | | 6/2000 | Wong et al. | 709/229 |
| 6,178,455 | B1 | | 1/2001 | Schutte et al. | 709/228 |
| 6,208,656 | B1 | | 3/2001 | Hrastar et al. | 370/401 |
| 6,230,203 | B1 | | 5/2001 | Koperda et al. | 709/229 |
| 6,249,523 | B1 | | 6/2001 | Hrastar et al. | 370/401 |
| 6,272,150 | B1 | | 8/2001 | Hrastar et al. | 370/486 |
| 6,282,208 | B1 | | 8/2001 | Bowcutt et al. | 370/486 |
| 6,286,058 | B1 | | 9/2001 | Hrastar et al. | 710/8 |
| 6,295,298 | B1 | | 9/2001 | Hrastar et al. | 370/409 |
| 6,670,577 | B2 | * | 4/2002 | Hattori et al. | 709/224 |
| 6,418,148 | B1 | * | 7/2002 | Kumar et al. | 370/468 |
| 6,813,277 | B2 | * | 11/2004 | Edmon et al. | 370/442 |

* cited by examiner

CONSTANT BIT RATE TRANSPORT IN A CONTENTION BASED MEDIUM ACCESS CONTROL

Matter enclosed in heavy brackets [ ] appears in the original patent but forms no part of this reissue specification; matter printed in italics indicates the additions made by reissue.

This application is a continuation of U.S. Application No. 08/732,668, filed October 16, 1996, now U.S. Patent No. 5,966,163, which claims the benefit of the priority of U.S. Provisional Application No. 60/005,747, filed October 20, 1995.

BACKGROUND OF THE INVENTION

1. Field of the Invention

The present invention relates to a mechanism to provide constant bit rate upstream data transport in a two way communication system (e.g., a cable TV system) that has a known contention based upstream data transport mechanism. In particular, the invention relates to a mechanism to provide the constant bit rate upstream data transport, such as for a telephone voice channel, in a way that is compatible with known contention based available bit rate upstream data transport mechanisms so that jitter requirements of the constant bit rate transmission are fulfilled while not adversely effecting the latency of the available bit rate upstream data transport.

2. Description of Related Art

The upstream channel of a cable system is expected to carry a variety of services ranging from CBR (Constant Bit Rate) to ABR (Available Bit Rate) as defined by the ATM Forum (Asynchronous Transfer Mode Forum). These two services have unique sets of quality of service requirements such as jitter. For the CBR services, bounded jitter is required but not for the ABR services. ABR performance is measured on the system response time where the access delay plays a key roll CBR and ABR data are also different on the prospects of the traffic patterns. CBR sources produce data in a constant rate fashion while the ABR sources are usually in the burst mode. In the shared upstream channel of the cable television (CATV) environment, the services can not be optimized by a single Medium Access Control (MAC) protocol due to the above differences. The contention based Medium Access Control algorithm has been shown as an appropriate protocol for the local area network (LAN) traffic to provide instant access but it can not provide a guaranteed access environment for CBR sources to achieve bounded jitter.

One family of the contention algorithms, Distributed Queue Random Access Protocol (DQRAP), which uses a separate field (other than the data field) for resolving collisions while the user data transmission is taking place at the same time has been proposed to optimize the system throughput for ABR traffic. DQRAP has shown 85% of utilization with reasonable average access delay. It falls short of providing guaranteed access in order to support CBR services.

What is needed is a priority preempt mechanism to support guaranteed access in a contention based media access protocol in order to optimize these two services in the same system.

Historically, guaranteed access is provided via a TDMA (time division multiple access) arrangement. However, the TDMA approach can only provide services of an integer multiplier of a base rate. For example, these services are possible, 16 Kbps, 32 Kbps, 48 Kbps, etc., if the base rate is 16 kbps. Any request between two layers results in bandwidth waste.

TDMA is based on a cyclic framing structure. Access to the media is usually restricted until the start of the next cycle. It can be a long time if the frame is large or the transmission rate is low.

Another scheme often employed for guaranteed performance is when a station is polled periodically and the station can indicate if there is information to send. Performance of the source data can be guaranteed but at a significant waste of bandwidth because of the need to send the poll to a station and the bandwidth wasted when the station has nothing to send.

A media access control mechanism such as DQRAP uses a separated fields called Control Mini-Slots (CMS) to resolve collided transmissions while actual data transmission occurs at the data slot. Several CMSs associated with a data slot form the basic transmission unit. A station with packets ready for transmission choose one of the CMSs randomly to gain the right to transmit. Those stations that have already obtained the transmission rights are scheduled in a virtual queue called TQ (each station knows the total number of waiting members and its position among them). The requesting stations are informed of the success of the access requests by feedback sent by the Central Controller on the downstream channel with what is called contention grants. DQRAP has shown good performance in terms of Utilization vs. Access Delays. It is difficult and expensive to implement a priority scheme during the contention phase without priority protection. DQRAP can not guarantee bounded jitter which is required in order to support CBR services.

XDQRAP (Extended Distributed Queue Random Access Protocol) is a Medium Access Control (MAC) protocol designed to satisfy a wide range of performances required by the services that the IEEE 802 14 network is expected to provide. It is a contention-based protocol that provides LAN type of traffic an instant access environment. With a central feedback mechanism that is a natural result of the tree-and-branch network topology, it seamlessly marries a reservation scheme to offer deterministic access for the Constant Bit Rate (CBR) services. The MAC was presented in the paper. A proposal to Use XDQRAP for the IEEE 802 14 (IEEE 802 14/95-068) incorporated herein by reference. Simulation results of the basic XDQRAP were presented in the paper Simulation of the Performance of XDQRAP under a Range of Conditions (IEEE 802 14/95-049) incorporated herein by reference.

In the XDQRAP model, the channel time is partitioned into a sequence of fixed-sized time slots. Each unit consists of a data field where the actual data transmissions takes place and a control field used for requesting data slots. The request field consists of two areas called Control Mini Slots (CMS) Stations with data to transmit follow a set of rules to put the transmission requests in one of the control mini slots. The contention resolution algorithm is a tree based approach since there are potentially more than one request in the same control mini slot. By taking advantage of the central feedback, XDQRAP keeps the newly arrived packets out of contention to achieve fast-coverage resolution cycle.

The status of the control mini-slots and the data slots are constantly monitored at the headend. Based on the information, the global queuing information is fed back to the network via the common downstream channel. An individual station, therefore, adjusts its local state-machine accordingly. The contention winning stations position themselves in the global transmission sequence. Stations that lose in the contention retry at the next scheduled time.

Voice and some video conferencing data streams require that data arrives at the receiver within a narrow window of time (i.e., minimum jitter). Having contention for data slots is thus not a good mechanism to use for Constant Bit Rate (CBR) data streams. What is needed is a mechanism whereby a station can be guaranteed to send data at fixed intervals without having to use the control mini-slots to request data slots.

SUMMARY OF THE INVENTION

It is an object to the present invention to provide a priority preempt mechanism to support guaranteed access in a contention based media access protocol. It is a further object of the present invention to provide a mechanism for constant bit rate upstream data transport, such as for a telephone voice channel, in a way that is compatible with known contention based available bit rate upstream data transport mechanisms so that jitter requirements of the constant bit rate transmission are fulfilled while not adversely effecting the latency of the available bit rate upstream data transport.

These and other objects are achieved in a method of granting rights for upstream data transmission from user terminals that includes processing contention requests to generate contention grants and maintaining a list of connections, each connection having specified a predetermined bit rate. The method is practiced in a two way cable system that includes a controller and a plurality of the user terminals. The controller sends a downstream data stream to the user terminals and receives an upstream data stream from the user terminals. The downstream data stream includes a plurality of grant fields, and the upstream data stream includes upstream data slots and upstream control slots. The method further includes scheduling preemptive grants for upstream data slots using selected fields of the plurality of,grant fields so as to provide preemptive grants for upstream data transport at a bit rate specified for each connection, sending to the user terminals a data transmission grant in a grant field of the plurality of grant fields for which a preemptive grant is scheduled, and sending to the user terminals a data transmission grant in a grant field of the plurality of grant fields in which a contention grant is pending and no preemptive grant is scheduled.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
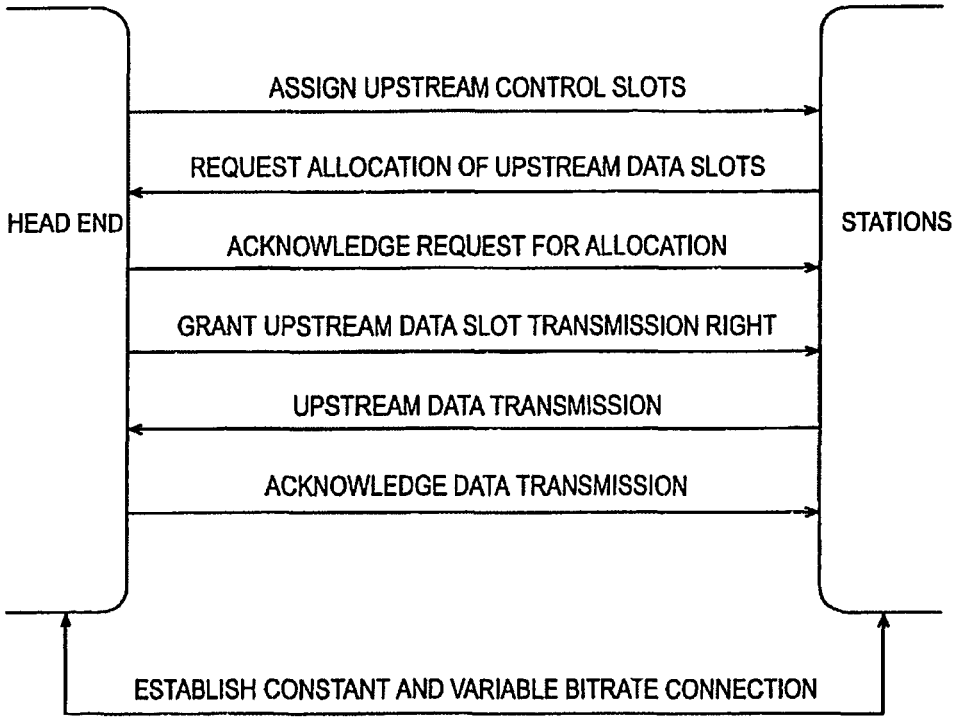
FIG. 1 is a function block diagram showing a signal interface between a headend and at least one station according to the present invention.

The preemptive grant mechanism can be used on top of DQRAP so that CBR sources can use access mechanisms such as DQRAP to obtain guaranteed access. The preemptive grant is issued by the Central Controller without a request from the station and bypasses the contention at the control mini-slot.

The preemptive grant mechanism is briefly described by the following:

1. When a CBR connection is committed, the Central Controller has information about the connection ID and the peak cell rate. This may be specified through a connection establishment mechanism such as the ITU standard Q.2931 incorporated herein by reference;
2. This information is added to a scheduler (part of the Central Controller function) which is tracking all the CBR connections in order to issue the preemptive grants;
3. The preemptive grants may be carried in the control mini-slot feedback on the downstream channel to inform the connections (stations) when the preemptive slots will be available. The contention users which are already in the TQ will also see the preemptive grants and priority preemption takes place.

The central controller operation is briefly described as follows:

1. The Central Controller receives a CBR requests and calculates the channel residual bandwidth to decide whether the connections can be granted. The connection will be rejected if there is not enough bandwidth;
2. The Central Controller creates (or adds the connection into) a scheduler;
3. The scheduler maintains a list of CBR connections and the associated information such as peak cell rates;
4. The preemptive grants are issued by the CBR scheduler when a scheduled slot is due;
5. The preemptive grants are carried on the downstream channel to the subscribers;
6. The TQ will not be changed.

For example, a feedback data field in the downstream channel from the controller to a user terminal will include a station or terminal ID and a transmission right type. The transmission right type may be encoded as:

| | |
|---|---|
| 00: | No Request |
| 01: | Contention Grant |
| 10: | Collision |
| 11: | Preemptive Grant |

Since the contention grants and preemptive grant share the control fields on the downstream channel, the Central Controller will try to minimize the impacts of the regular contention operation by choosing the feedback data field based on the following order: no request, then collision, then contention grant.

When a preemptive grant is generated by the scheduler, the Central Controller scans through the incoming control mini-slot field and chooses a feedback data field based on the above criteria. It also overwrites the ID field by the CBR connection ID and the feedback field by '11'.

The user terminal (station) operation is briefly described as follows. The basic idea is to treat a preemptive grant as if it were a collision indication.

The station having newly arrived messages.

The stations treat it as TQ>0 cases once they see FB=11.

The stations holding TQ positions.

The station holding the first position will be preempted and not transmit on the current slot. The stations holding the positions other than the first will not have an effect since the TQ value broadcasted by the Central Controller is not changed.

The station in the contention process.

The stations putting their request in the control mini-slot overwritten by the Central Controller treat it as a collision; it is equivalent to FB='10'. Those stations using a different mini-slot are not impacted.

The CBR station

Transmit the cell on the current slot. Essentially, the station which requests a CBR service needs to maintain two queues: the TQ and a CBR queue. XDQRAP does an excellent job of handling bursty computer data by providing immediate access for data transmission during light loads and high utilization through fast contention resolution during heavy loads. To summarize XDQRAP protocol:

1. A station randomly chooses one of the Control Mini-Slots (CMS) to put on the connection ID and it indicates the number of cells it wishes to transmit (reservation mode). With modifications to XDQRAP, the number of control mini-slots may be dynamically varied.
2. If a station has only a single cell to transmit and the data slot is not being used, it also puts the data in the data slot (immediate mode).
3. The head-end provides the feedback information for the CMSs and data slot transmission time. If two or more stations collided on a CMS, they enter a collision resolution mode. No new stations can compete for this CMS until it is resolved. If no collision occurred, and the data was sent with the request, the data is forwarded to the destination. If a station has requested multiple slots, the head-end informs the station the starting data slot number to use and the number of slots it can have.
4. Since there are multiple CMSs, the system can overlap contention resolution with data transfers. There is no collision possible for the data slots in reservation mode. The system is stable for offered loads >100% because of separated contention and data transfer areas.

Many stations vie for usage for the data slots and it is possible for delays to occur as stations resolve the contention for these data slots. As seen by the receiver of this data, there could be variation of arrival times even if the information was sent on a periodic basis. For data streams that require minimal buffering, trying to accommodate this variation in arrival time is unacceptable. Embodiment of present invention to handle Continuous Bit Rate (CBR) data streams are described as follows.

FIG. 1 shows information that flows between the headend and at least one user terminal or station having one or more connections. A user terminal may have assigned thereto plural connection identifications (IDs) to support diverse message traffic. The head-end and each user terminal includes a data modulator, a data demodulator and a processor (with memory and input/output circuit).

For available bit rate traffic (ABR traffic), the headend broadcast upstream control slot (e.g., control mini-slot) assignment data to the user terminals. The user terminals store this assignment data and use it to locate where requests may be placed in the upstream data stream.

When a user terminal has ABR data to send to the head-end, the user terminal sends a request in an assigned control slot to request an allocation of upstream data slots to carry the ABR data. Then the head-end acknowledges receipt of the request for allocation.

For constant bit rate (CBR) and variable but rate (VBR) traffic, the user terminals communicate with the head-end to establish a connection. The connection is good until cancelled. It does not have to be renewed with each quantum of data to be transferred. The communication channel may be over the cable network or outside of the cable network (e.g., via telephone line).

The head-end schedules upstream data slots to carry data for all CBR and VBR connections and then schedules upstream data slots to carry data for the pending ABR requests. The head-end then broadcasts grants to the user terminals that give data transmission rights to specifically identified station IDs to carry data upstream in specifically identified upstream data slots based on the above described schedule. In this way CBR and VBR jitter requirements can be fulfilled in systems with ABR contention based mechanisms.

The user terminal responds to a grant by sending the specified data (e.g., defined by station ID) upstream in the specified data slot. Receipt of the upstream data transmission is then acknowledged by the head-end.

Figure 2:
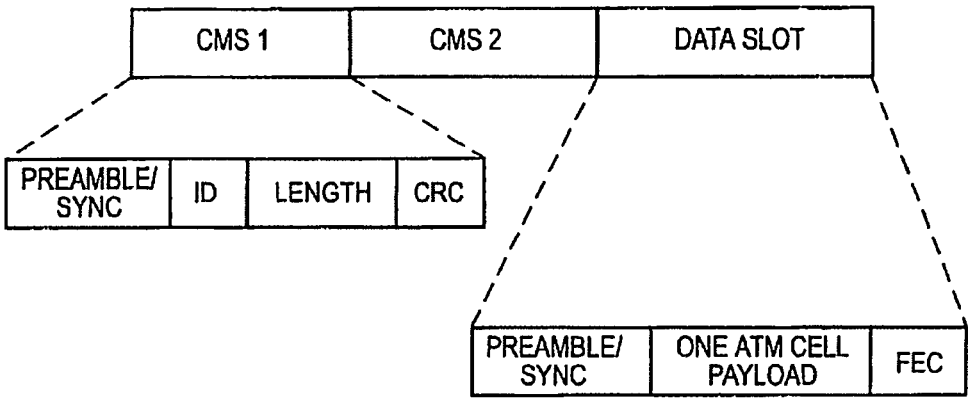
FIG. 2 is a format diagram showing an exemplary format for the upstream frame.

FIG. 2 shows an upstream frame, used for signaling requests and transmitting data from stations to the head-end as used in one embodiment of the invention. The frame includes a data slot and two Control Mini Slots (CMS). Other configurations may be used.

Figure 3:
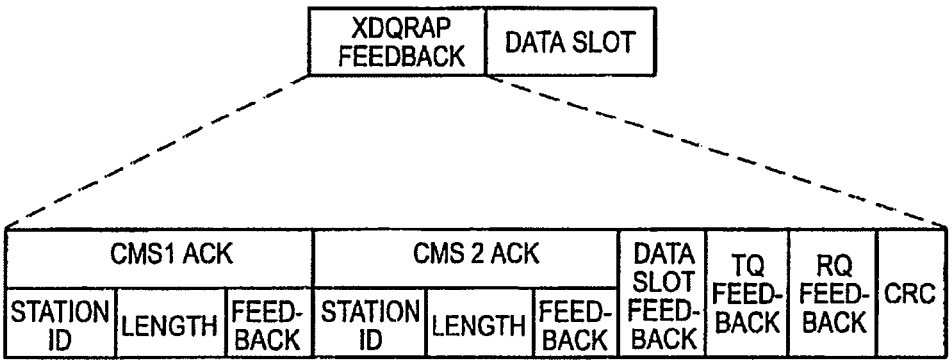
FIG. 3 is a format diagram showing an exemplary format for the downstream frame.

The downstream data frame (e.g., FIG. 3) carries the feedback of the global queuing information and user data from the headend to the stations. The feedback information includes CMS Ack for the control mini-slots, the current values of TQ and RQ, and the status of the data slot. The feedback field is followed by a data slot field containing a number of ATM cells. There is one feedback field for each upstream channel.

In the cable environment there needs to be some centralized control (e.g., at the headend) to allow for authorizing stations to use the network, providing security, and statistics gathering for billing. Generically, this function is called network control and there is at least one element responsible for network resources. The entity responsible for the network resources is called the network control element.

Prior to transmitting data, a station must request a connection be setup by the network. As part of the connection setup process, it informs the network about the characteristics of the path. One of the ways to define the characteristics is called Q.2931, an ITU standard incorporated herein by reference. The process of sending and receiving information about the connection is called signaling. In our environment the signaling information is sent to a network control element located at the head-end.

Q.2931 signaling information consists of the bandwidth, delay and jitter requirements for this connection. CBR data streams would request a specific data rate, maximum end-to-end delay and jitter tolerance. ABR traffic would have the CBR parameters plus minimum bandwidth and burst size information. Several network entities may be involved in the connection such as a switch, intermediate controllers and the destination. Each of these entities can accept, modify or reject the various parameters of the signaling information. This ensures that the network resources exist to support the type of connection required for a particular data stream.

Figure 4:
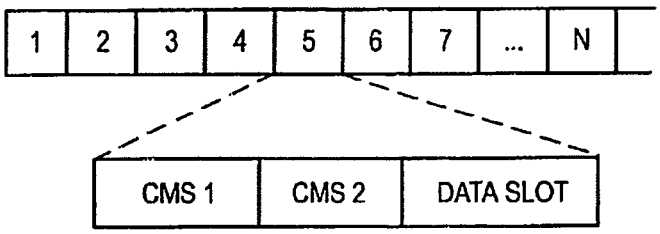
FIG. 4 is a format diagram showing a conceptual upstream time division multiplex of upstream frames.

The CMS and data slot can be viewed as a single entity and part of an infinitely long time domain multiplex (TDM) frame starting at number 1 and going on indefinitely (see FIG. 4). The slot number is the TQ (Transmission Queue) number.

When a station initiates a CBR connection, the head-end begins to allocate a 'TDM slot' periodically at a rate equal to the requested data rate. It can do this because it knows what information rate has been requested and the amount of jitter the connection requires. From the first frame, the head-end is able to calculate the slot number for every data transmission for that connection. Because its centralized control can have other stations transmit data on data slots not previously reserved by CBR connections. This mechanism for providing a station a data slot (TQ) number without the station having to request it via a Control Mini-Slot is called a preemptive grant.

As an example, assume a station wants to request a connection having a bandwidth of 64 Kb/s and minimal jitter. The network control element calculates that the connection requires 167 ATM cells (64 Kb/sec)/(8 bits /byte)/(48 bytes/ATM cell)) to be available in the upstream direction every second. For an upstream QPSK signal of 1 MHz, a 1.544 Mb/s data rate is possible. Our 'TDM slot' consists of 82 bytes and this translates into 2,353 ((1.5 Mb/sec)/(8 bits/byte)/(82 bytes/frame)) available frames in a second. The network controller will allocate every 14th (167/2,353) 'TDM slot' to the station requesting the 64 Kb/sec CBR connection.

Figure 5:
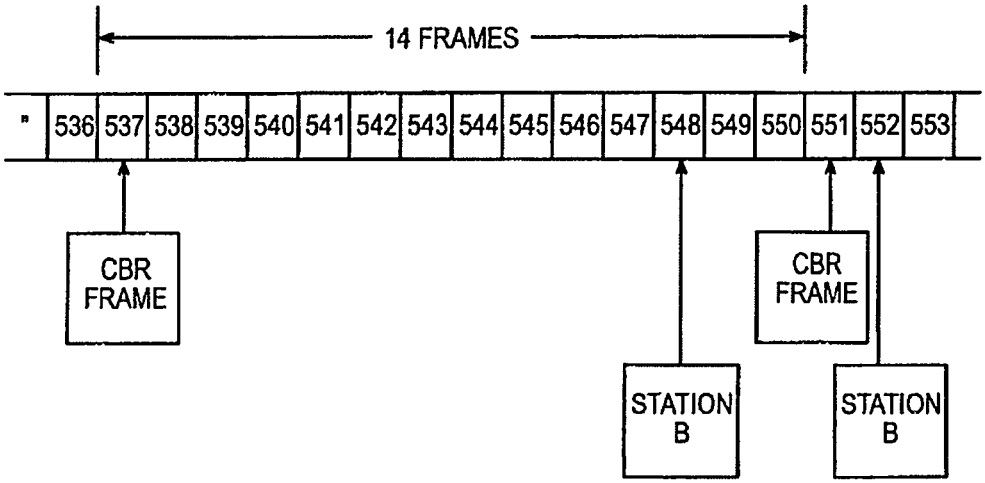
FIG. 5 is a format diagram showing an exemplary embodiment of how the CBR data and the ABR data may share an upstream channel.

As an example, FIG. 5 shows how the CBR and ABR traffic coexist. Assume that the above CBR connection was already established for Station A and another station, Station B, wanted to transmit 5 ATM cells. Using FIG. 5, the network controller issued a preemptive grant during frame 537 and will issue one again during frame 551.

The controller received Station B's request and will issue a starting frame of 548 in response to Station B's request. Because the controller knows that Station A's frame will occur in the middle of the 5 frames, the controller will only allow Station B to have 3 ATM cells transmitted Station B can issue an immediate request for another 2 ATM cells and have that resolved before the completion of the CBR Frame and transmit the remaining 2 ATM cells starting at frame 552.

In order to make the CBR connections work and to maintain the quality of service for the stations, the network controller must receive the desired network service level from the originating station. As mentioned before, an existing standard from the International Telecommunications Union (ITU) known as Q.2931 may be a useful mechanism to convey the connection characteristics to the network. A subset of this standard (Q.931, 0.932, Q.933) is used in ISDN, Frame Relay and ATM signaling.

Multiple connections from a modem can be multiplexed over the same physical link. Each connection can have a different class of service such as CBR, VBR, ABR and UBR. The network also guarantees the amount of maximum delay the packet will incur through the network and the amount of variation in arrival time (packet arrival jitter).

The quality of the connection between the source and destination modems is determined by the source modem specifying the characteristics of the connection. The quality of service parameters are negotiated during the connection setup phase. If the modem does not specify a value for a particular parameter, then the default value is assumed. Default values may be network specific or may be established at connection set-up time.

There are three phases of a connection: connection establishment, data transfer, and termination. Connection established is the process of establishing a path through the network that has the characteristics specified. After establishing the connection, the information flows may commence data transfer. After the information has been transferred, the source is required to notify the network to terminate the connection. This termination notification is in the form of a disconnect sequence, and it is required to allow the network to reclaim network resources dedicated to this connection.

Messages are packets that flow between the source modem to the network in order to perform a desired function. The network may return the information requested or request information from devices outside the network.

As discussed above, there is a need to establish parameters that the headend controller will use when the scheduling algorithm. As a useful mechanism for relaying the connection requirements, ITU standard Q.2931 may be employed.

Figure 6:
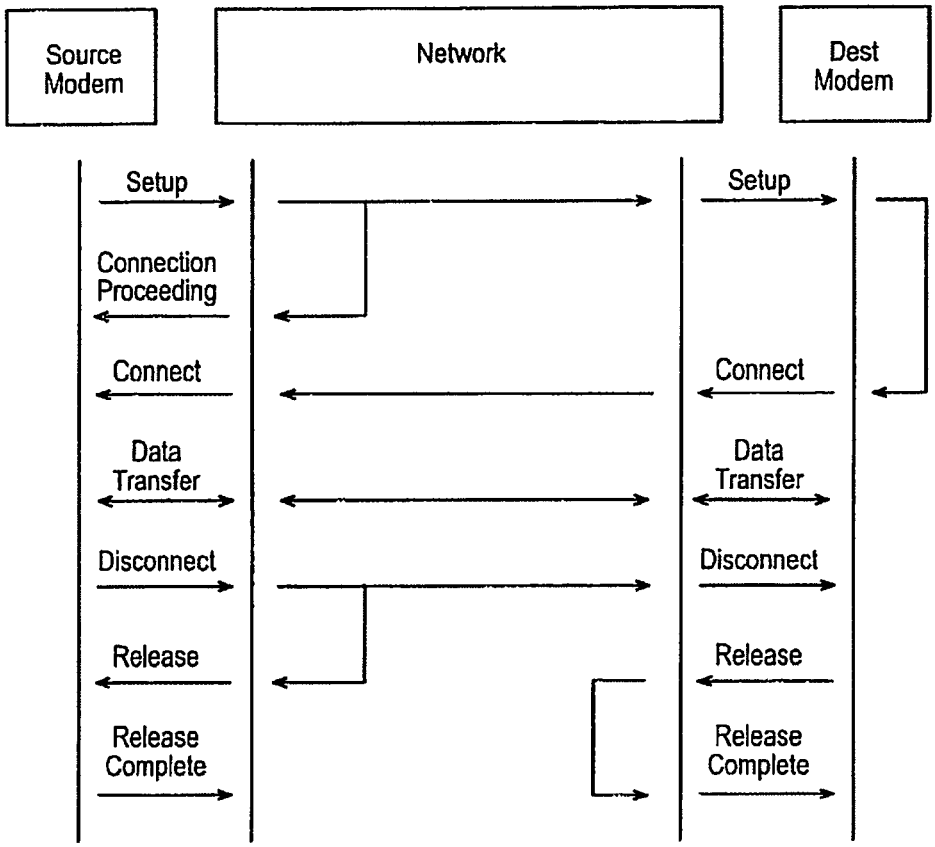
FIG. 6 is a function block diagram showing a signal interface of signals used to establish a CBR connection.

FIG. 6 shows an overview of the connection control messages that flow during the various phases of a connection.

Each packet in a message contains one or more fields called 'Information Elements'. Information elements contain the logical parameters associated with that element. For example, the information element for the 'End-to-End Transit Delay' contains the initiator's requested transit delay and the maximum transit delay that would be accepted. The main Information Elements are listed in Table 1. Some of the connection control messages are described in Table 2.

TABLE 1

INFORMATION ELEMENT IDENTIFIER CODING

| IDENTIFIER # FOR IE | | INFORMATION ELEMENT |
|---|---|---|
| 8765 | 4321 | NAME |
| 0000 | 0100 | Bearer Capability |
| 0100 | 0010 | End-to-End Transit Delay |
| 0000 | 1000 | Cause |
| 0001 | 1001 | Network Connection Identifier |
| 0100 | 1000 | Bandwidth Control Parameters |
| 0110 | 1100 | Source Address |
| 0110 | 1101 | Source Sub-address |
| 0111 | 0000 | Destination Address |
| 0111 | 0001 | Destination Sub-address |
| 0111 | 1110 | User-User |
| 1010 | 0000 | More Data |

TABLE 2

CONNECTION CONTROL MESSAGES

Setup - This message is sent by the initiating modem to the network and by the network to the destination to initiate connection establishment.
Connection Proceeding - This message is sent by the destination to the network or by network to the source. It indicates that the requested connection established has been initiated and no more connection establishment information will be accepted.
Connect - This message is sent by the destination to the network and by the network to the source to indicate connection acceptance by the destitnation.
Alerting - This message is sent by the destination to the network and by the network to the source to indicate that destination alerting has been initiation.
Release - This message is sent by the initiator or the network to indicate that the equipment sending the message has disconnected the connection and intends to release the network connection identifier (if any) and the connection reference. The receiving equipment should release the network connection identifier and prepare to release the connection reference after sending RELEASE COMPLETE.
Release Complete - This message is sent by the initiator or the network to indicated that the equipment sending the message has released the connection and, if appropriate, the channel. The channel, if released, is available for reuse. The receiving equipment shall release the connection
Disconnect - This message may be sent by either to request the network to clear the connection or it may be sent by the network to indicate that the connection is cleared.
Status Enquiry - This message may be sent by the user or the network at any time to solicit a STATUS message from the peer layer 3 entity. Sending a STATUS message in response to a STATUS ENQUIRY message is mandatory. This message is sent by the initiator or the network at any time during a connection to report certain error conditions as listed in section 5.8 of Recommendation Q.931
User Information - This message is sent by the user to the network to transfer information to the remote user. This message is also sent by the network to the user to deliver information from the other user. This message is used if the user-to-user transfer is part of an allowed information transfer. This message is sent by the user or the network at any time to solicit a STATUS message from the peer layer 3 entity.

TABLE 2-continued

| CONNECTION CONTROL MESSAGES |
| --- |
| Sending a STATUS message in response to a STATUS ENQUIRY message is mandatory. |

Generically, these messages are called connection control messages. A typical connection control packet would include a Protocol Discriminator, a Connection Reference, a Message Type and one or more Information Elements.

A particular message may contain more information than a particular network needs or can understand. All equipment should be able to ignore any extra information present in a message that is not required for the proper operation of that equipment. For example, the source may ignore the source address during the CONNECT message since it should be its own address.

The purpose of the Protocol Discriminator is to distinguish messages for network connection control from other messages within Q.931. It also distinguishes messages of Q.931 from OSI network layer protocol units that are coded to other ITU Recommendations and other standards.

The value for this field should be x'08' (hexadecimal 08) which is the value for the Q.931/(I 451) user-network call control messages specified in section 4.2 of Recommendation Q.931.

The purpose of the Connection Reference is to identify the connection to which the particular message applies. The Connection Reference does not have end-end significance across the network. Sec section 4.3 of Recommendation Q.931.

Connection Reference values are assigned by the originating side of the interface for a connection. These values are unique to the originating side only within a particular network port link. The Connection Reference value is assigned at the beginning of a connection and remains fixed for the lifetime of a connection. After a connection ends, the associated Connection Reference value may be reassigned to a later connection. Two identical Connection Reference values on the same connection may be used when each value pertains to a connection originated at opposite ends of the link.

Information Element identifiers (IE) are logical groupings of parameters needed to convey information. The Information Element has its own unique identifier, length field and parameters. Each Information Element remains the same regardless of the Message Type. Usually a particular information element may be present only once in a given message.

Having described preferred embodiments of a novel constant bit rate mechanism in a contention based medium access control (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims

What is claimed is:

1. A method employed in a two way communications system comprising a controller and a plurality of user terminals, the two way communications system capable of carrying information flows and bursts of data of the plurality of user terminals, the controller transmitting downstream information to the plurality of user terminals on at least one downstream channel, the plurality of user terminals transmitting upstream information to the controller on at least one shared upstream channel of a shared communications medium, the bandwidth of the at least one shared upstream channel being divided into upstream time slots, the upstream time slots capable of carrying reservation requests and data, at least one media access control mechanism being used to resolve contention for transmission on the at least one shared upstream channel, an upstream information transmission of at least one first user terminal of the plurality of user terminals capable of colliding on the at least one shared upstream channel with an upstream information transmission of at least one second user terminal of the plurality of user terminals, the method comprising the steps of:

processing a reservation request that solicits a first grant of at least one first upstream time slot to carry a requested burst of data, the requested burst of data having a requested burst size of finite amount;

maintaining a list of at least one information flow, the list of at least one information flow being associated with at least one service parameter;

scheduling a second grant of at least one second upstream time slot, the scheduling being based at least upon a first entry in the list of the at least one information flow and the at least one service parameter, the second grant being scheduled to provide a first information flow with a quality of service indicated by the at least one service parameter, the first information flow being associated with the first entry in the list of at least one information flow;

sending notice of the first grant to the plurality of user terminals responsive to the reservation request that solicits the first grant, the notice of the first grant indicating an allocation of the at least one first upstream time slot to carry a granted burst of data, the granted burst of data having a granted burst size and comprising a finite amount of data; and sending notice of the second grant to the plurality of user terminals responsive to the scheduling of the second grant, the notice of the second grant indicating an allocation of the at least one second upstream time slot to carry data that is at least part of the first information flow.

2. The method of claim 1, wherein the at least one second upstream time slot is allocated to meet a specified bit rate.

3. The method of claim 1, wherein the at least one first upstream time slot is not allocated to any information flow associated with at least one entry in the list of at least one information flow and is utilized to carry data that is independent from data carried by each information flow associated with at least one entry in the list of at least one information flow.

4. The method of claim 1, wherein maintaining the list of at least one information flow further comprises the steps of:

monitoring at least one message that carries information flow signaling; and modifying the list of at least one information flow responsive to the at least one message that carries information flow signaling.

5. The method of claim 4, wherein the at least one message that carries information flow signaling comprises at least one information element that signals the at least one service parameter.

6. The method of claim 4, wherein the at least one message that carries information flow signaling is communicated using at least one protocol selected from the group consisting of: Q.2931, Q.931, Q.932, and Q.933.

7. The method of claim 4, wherein the modifying step further comprises the steps of:

creating the first entry in the list of at least one information flow responsive to establishment of the first information flow, the establishment signaled by the at least one message that carries information flow signaling; and deleting the first entry in the list of at least one information flow responsive to termination of the first information flow, the termination signaled by the at least one message that carries information flow signaling.

8. The method of claim 4, wherein the at least one message that carries information flow signaling is communicated upstream from the plurality of user terminals to the controller by being carried in the upstream time slots.

9. The method of claim 4, wherein the upstream time slots comprise a first type of upstream time slots and a second type of upstream time slots, the first type of upstream time slots limited to carrying reservation requests, and the second type of upstream time slots capable of carrying data that is not limited to reservation requests.

10. The method of claim 9, wherein the controller dynamically varies how many of the first type of upstream time slots exist relative to how many of the second type of upstream time slots exist in a specified amount of time.

11. The method of claim 9, wherein the first type of upstream time slots are upstream control mini-slots.

12. The method of claim 9, wherein the second type of upstream time slots are upstream data slots.

13. The method of claim 12, wherein the at least one message that carries information flow signaling is communicated upstream from the plurality of user terminals to the controller by being carried in upstream data slots.

14. The method of claim 4, wherein the list of at least one information flow comprises a list of at least one committed connection.

15. The method of claim 9, wherein the at least one first user terminal generates a first reservation request transmission in at least one third upstream time slot, wherein the at least one second user terminal generates a second reservation request transmission in the at least one third upstream time slot, and wherein the first reservation request transmission of the at least one first user terminal has a reservation request collision with the second reservation request transmission of the at least one second user terminal.

16. The method of claim 15, wherein the at least one first user terminal and the at least one second user terminal perform a contention resolution.

17. The method of claim 15, wherein the at least one third upstream time slot is of the first type of upstream time slots.

18. The method of claim 15, wherein the reservation request and the first grant are at least part of a reservation mode media access control (MAC) mechanism.

19. The method of claim 15, wherein the granted burst size is less than the requested burst size.

20. The method of claim 15, wherein the at least one first user terminal generates a first upstream data transmission in at least one fourth upstream time slot, wherein the at least one second user terminal generates a second upstream data transmission in the at least one fourth upstream time slot, and wherein the first upstream data transmission of the at least one first user terminal has a data collision with the second upstream data transmission of the at least one second user terminal.

21. The method of claim 20, wherein the at least one fourth upstream time slot is of the second type of upstream time slots.

22. The method of claim 20, wherein the second type of upstream time slots are upstream data slots.

23. The method of claim 20, wherein the data collision of the first upstream data transmission with the second upstream data transmission results from the at least one first user terminal and the least one second user terminal contending for the fourth upstream time slot as at least part of an immediate mode media access control (MAC) mechanism.

24. The method of claim 23, wherein the immediate mode media access control (MAC) mechanism allows at least two user terminals of the plurality of user terminals to attempt to transmit in an upstream data time slot.

25. The method of claim 15, wherein the quality of service indicated by the at least one service parameter is used to implement at least one class of service.

26. The method of claim 25, wherein the at least one class of service is at least one selection from the group consisting of constant bit rate (CBR), variable bit rate (VBR), available bit rate (ABR), and unspecified bit rate (UBR).

27. The method of claim 15, wherein the two way communications system is a cable system.

28. The method of claim 1, wherein the first information flow occurs from a committed connection.

29. The method of claim 1, wherein the shared communications medium is at least part of a cable television (CATV) networking environment.

30. The method of claim 1, wherein the shared communications medium is at least part of a local area network (LAN).

31. The method of claim 1, wherein at least one of the plurality of user terminals is a cable modem.

32. The method of claim 1, wherein the quality of service indicated by the at least one service parameter is used to implement at least one class of service.

33. The method of claim 32, wherein the at least one class of service is at least one selection from the group consisting of: constant bit rate (CBR), variable bit rate (VBR), available bit rate (ABR), and unspecified bit rate (UBR).

34. The method of claim 32, wherein the at least one class of service is defined by the ATM Forum (Asynchronous Transfer Mode Forum).

35. The method of claim 1, wherein the at least one service parameter comprises at least one bit rate.

36. The method of claim 1, wherein the at least one service parameter comprises at least one jitter requirement.

37. The method of claim 1, wherein the at least one service parameter comprises at least one transit delay requirement.

38. The method of claim 1, wherein the two way communications system is a cable system.

39. The method of claim 1, wherein the controller is a head-end device.

40. The method of claim 1, wherein the upstream time slots comprise a first type of upstream time slots and a second type of upstream time slots, the first type of upstream time slots limited to carrying reservation requests, and the second type of upstream time slots capable of carrying data that is not limited to reservation requests.

41. The method of claim 40, wherein the controller dynamically varies how many of the first type of upstream time slots exist relative to how many of the second type of upstream time slots exist in a specified amount of time.

42. The method of claim 40, wherein the first type of upstream time slots are upstream control mini-slots.

43. The method of claim 40, wherein the second type of upstream time slots are upstream data slots.

44. The method of claim 40, wherein the at least one first user terminal generates a first reservation request transmission in at least one third upstream time slot, wherein the at least one second user terminal generates a second reservation request transmission in the at least one third upstream time slot, and wherein the first reservation request transmission of the at least one first user terminal has a reservation request collision with the second reservation request transmission of the at least one second user terminal.

45. The method of claim 44, wherein the at least one first user terminal and the at least one second user terminal perform a contention resolution.

46. The method of claim 44, wherein the at least one third upstream time slot is of the first type of upstream time slots.

47. The method of claim 44, wherein the reservation request and the first grant are at least part of a reservation mode media access control (MAC) mechanism.

48. The method of claim 40, wherein the at least one first user terminal generates a first upstream data transmission in at least one fourth upstream time slot, wherein the at least one second user terminal generates a second upstream data transmission in the at least one fourth upstream time slot, and wherein the first upstream data transmission of the at least one first user terminal has a data collision with the second upstream data transmission of the at least one second user terminal.

49. The method of claim 48, wherein the at least one fourth upstream time slot is of the second type of upstream time slots.

50. The method of claim 48, wherein the data collision of the first upstream data transmission with second upstream data transmission results from the at least one first user terminal and the least one second user terminal contending for the first upstream time slot as at least part of an immediate mode media access control (MAC) mechanism.

51. The method of claim 50, wherein the immediate mode media access control (MAC) mechanism allows at least two user terminals of the plurality of user terminals to attempt to transmit in an upstream data time slot.

52. The method of claim 1, wherein the granted burst size is less than the requested burst size.

53. The method of claim 1, wherein the notice of the first grant comprises a first identifier associated with at least one user terminal of the plurality of user terminals.

54. The method of claim 53, wherein the first identifier is a user terminal identifier.

55. The method of claim 53, wherein the requested burst size represents a requested number of the upstream time slots and wherein the granted burst size represents a granted number of the upstream time slots.

56. The method of claim 55, wherein the notice of the first grant further comprises an indication of a starting upstream time slot for transmission and an indication of the granted number of the upstream time slots that are allocated in the first grant.

57. The method of claim 55, wherein the granted number of the upstream time slots is less than the requested number of the upstream time slots.

58. The method of claim 1, wherein the notice of the second grant comprises a second identifier associated with at least one user terminal of the plurality of user terminals.

59. The method of claim 58, wherein the second identifier is a connection identifier.

60. The method of claim 58, wherein the notice of the second grant further comprises an indication of a starting upstream time slot for transmission and an indication of a number of the upstream time slots that are allocated in the second grant.

61. The method of claim 1, wherein the first information flow is associated with a third identifier.

62. The method of claim 61, wherein the third identifier is a connection reference.

63. The method of claim 1, wherein the reservation request comprises a first identifier associated with at least one user terminal of the plurality of user terminals.

64. The method of claim 63, wherein the first identifier is a user terminal identifier.

65. The method of claim 1, wherein a single user terminal of the plurality of user terminals generates a first upstream data transmission as at least part of the first information flow, wherein the single user terminal generates a second upstream data transmission as at least part of at least one second information flow, the at least one second information flow being associated with a second entry in the list of at least one information flow, the first information flow and the at least one second information flow both being active and multiplexed over the shared communications medium.

66. The method of claim 65, wherein the first information flow provides a first class of service and the at least one second information flow provides a second class of service.

67. The method of claim 66, wherein the first class of service and the second class of service are each at least one selection from the group consisting of: constant bit rate (CBR), variable bit rate (VBR), available bit rate (ABR), and unspecified bit rate (UBR).

68. The method of claim 66, wherein the first class of service is different from the second class of service.

69. A controller in a two way communications system comprising the controller and a plurality of user terminals, the two way communications system capable of carrying information flows and bursts of data of the plurality of user terminals, the controller transmitting downstream information to the plurality of user terminals on at least one downstream channel, the plurality of user terminals transmitting upstream information to the controller on at least one shared upstream channel of a shared communications medium, the bandwidth of the at least one shared upstream channel being divided into upstream time slots, the upstream time slots capable of carrying reservation requests and data, at least one media access control mechanism being used to resolve contention for transmission on the at least one shared upstream channel, an upstream information transmission of at least one first user terminal of the plurality of user terminals capable of colliding on the at least one shared upstream channel with an upstream information transmission of at least one second user terminal of the plurality of user terminals, the controller comprising:

logic configured to process a reservation request that solicits a first grant of at least one first upstream time slot to carry a requested burst of data, the requested burst of data having a requested burst size of finite amount;

logic configured to maintain a list of at least one information flow, the list of at least one information flow being associated with at least one service parameter;

logic configured to schedule a second grant of at least one second upstream time slot, the scheduling being based at least upon a first entry in the list of the at least one information flow and the at least one service parameter, the second grant being scheduled to provide a first information flow with a quality of service indicated by the at least one service parameter, the first information flow being associated with the first entry in the list of at least one information flow;

logic configured to [sending] *send* notice of the first grant to the plurality of user terminals responsive to the reservation request that solicits the first grant, the notice of the first grant indicating an allocation of the at least one first upstream time slot to carry a granted burst of data, the granted burst of data having a granted burst size and comprising a finite amount of data; and logic configured to [sending] *send* notice of the second grant to the plurality of user terminals responsive to the scheduling of the second grant, the notice of the second grant indicating an allocation of the at least one second upstream time slot to carry data that is at least part of the first information flow.

70. The controller of claim 69, wherein the at least one second upstream time slot is allocated to meet a specified bit rate.

71. The controller of claim 69, wherein the at least one first upstream time slot is not allocated to any information flow associated with at least one entry in the list of at least one information flow and is utilized to carry data that is independent from data carried by each information flow associated with at least one entry in the list of at least one information flow.

72. The controller of claim 69, wherein the logic configured to maintain the list further comprises:

logic configured to monitor at least one message that carries information flow signaling; and logic configured to modify the list of at least one information flow responsive to the at least one message that carries information flow signaling.

73. The controller of claim 72, wherein the at least one message that carries information flow signaling comprises at least one information element that signals the at least one service parameter.

74. The controller of claim 72, wherein the at least one message that carries information flow signaling is communicated using at least one protocol selected from the group consisting of: Q.2931, Q.931, Q.932, and Q.933.

75. The controller of claim 69, wherein the first information flow occurs from a committed connection.

76. The controller of claim 69, wherein the shared communications medium is at least part of a cable television (CATV) networking environment.

77. The controller of claim 69, wherein the shared communications medium is at least part of a local area network (LAN).

78. The controller of claim 69, wherein at least one of the plurality of user terminals is a cable modem.

79. The controller of claim 69, wherein the quality of service indicated by the at least one service parameter is used to implement at least one class of service.

80. The controller of claim 79, wherein the at least one class of service is at least one selection from the group consisting of: constant bit rate (CBR), variable bit rate (VBR), available bit rate (ABR), and unspecified bit rate (UBR).

81. The controller of claim 79, wherein the at least one class of service is defined by the ATM Forum (Asynchronous Transfer Mode Forum).

82. The controller of claim 69, wherein the at least one service parameter comprises at least one a bit rate.

83. The controller of claim 69, wherein the at least one service parameter comprises at least one jitter requirement.

84. The controller of claim 69, wherein the at least one service parameter comprises at least one transit delay requirement.

85. The controller of claim 69, wherein the two way communications system is a cable system.

86. The controller of claim 69, wherein the upstream time slots comprise a first type of upstream time slots and a second type of upstream time slots, the first type of upstream time slots limited to carrying reservation requests, and the second type of upstream time slots capable of carrying data that is not limited to reservation requests.

87. The controller of claim 86, wherein the controller dynamically varies how many of the first type of upstream time slots exist relative to how many of the second type of upstream time slots exist in a specified amount of time.

88. The controller of claim 69, wherein the at least one first user terminal generates a first reservation request transmission in at least one third upstream time slot, wherein the at least one second user terminal generates a second reservation request transmission in the at least one third upstream time slot, and wherein the first reservation request transmission of the at least one first user terminal has a reservation request collision with the second reservation request transmission of the at least one second user terminal.

89. The controller of claim 69, wherein the at least one first user terminal generates a first upstream data transmission in at least one fourth upstream time slot, wherein the at least one second user terminal generates a second upstream data transmission in the at least one fourth upstream time slot, and wherein the first upstream data transmission of the at least one first user terminal has a data collision with the second upstream data transmission of the at least one second user terminal.

90. The controller of claim 69, wherein the granted burst size is less than the requested burst size.

91. The controller of claim 69, wherein a single user terminal of the plurality of user terminals generates a first upstream data transmission as at least part of the first information flow, wherein the single user terminal generates a second upstream data transmission as at least part of at least one second information flow, the at least one second information flow being maintained by the at least one first user terminal, the first information flow and the at least one second information flow both being active and multiplexed over the shared communications medium.

92. The controller of claim 91, wherein the first information flow provides a first class of service that is at least one selection from the group consisting of: constant bit rate (CBR), variable bit rate (VBR), available bit rate (ABR), and unspecified bit rate (UBR), and wherein the at least one second information flow provides a second class of service that is at least one selection from the group consisting of: constant bit rate (CBR), variable bit rate (VBR), available bit rate (ABR), and unspecified bit rate (UBR).

93. A method employed in a two way communications system comprising a controller and a plurality of user terminals, the two way communications system capable of carrying information flows and bursts of data of the plurality of user terminals, the controller transmitting downstream information to the plurality of user terminals on at least one downstream channel, the plurality of user terminals transmitting upstream information to the controller on at least one shared upstream channel of a shared communications medium, the bandwidth of the at least one shared upstream channel being divided into upstream time slots, the upstream time slots capable of carrying reservation requests and data, at least one media access control mechanism being used to resolve contention for transmission on the at least one shared upstream channel, an upstream information transmission of at least one first user terminal of the plurality of user terminals capable of colliding on the at least one shared upstream channel with an upstream information transmission of at least one second user terminal of the plurality of user terminals, the method comprising the steps of:

sending a reservation request that solicits a first grant of at least one first upstream time slot to carry a requested burst of data, the requested burst of data having a requested burst size of finite amount;

maintaining a first information flow, the first information flow being associated with at least one service parameter, the first information flow having a quality of service indicated by the at least one service parameter;

receiving notice of the first grant from the controller responsive to the reservation request that solicits the first grant, the notice of the first grant indicating an allocation of the at least one first upstream time slot to carry a granted burst of data, the granted burst of data having a granted burst size and comprising a finite amount of data; and receiving notice of a second grant from the controller responsive to the controller scheduling of a second grant, the notice of the second grant indicating an allocation of the at least one second upstream time slot to carry data that is at least part of the first information flow.

94. The method of claim 93, wherein the two way communications system is a cable system.

95. The method of claim 93, wherein the quality of service indicated by the at least one service parameter is used to implement at least one class of service that is at least one selection from the group consisting of: constant bit rate (CBR), variable bit rate (VBR), available bit rate (ABR), and unspecified bit rate (UBR).

96. The method of claim 93, wherein the at least one service parameter is at least one selection from the group consisting of: at least one bit rate, at least one jitter requirement, and at least one transit delay requirement.

97. The method of claim 93, wherein maintaining the first information flow further comprises the steps of:

monitoring at least one message that carries information flow signaling; and modifying a status of the first information flow responsive to the at least one message that carries information flow signaling.

98. The method of clam 93, wherein the upstream time slots comprise a first type of upstream time slots and a second type of upstream time slots, the first type of upstream time slots limited to carrying reservation requests, and the second type of upstream time slots capable of carrying data that is not limited to reservation requests.

99. The method of claim 98, wherein the controller dynamically varies how many of the first type of upstream time slots exist relative to how many of the second type of upstream time slots exist in a specified amount of time.

100. The method of claim 93, wherein the at least one first user terminal generates a first reservation request transmission in at least one third upstream time slot, wherein the at least one second user terminal generates a second reservation request transmission in the at least one third upstream time slot, and wherein the first reservation request transmission of the at least one first user terminal has a reservation request collision with the second reservation request transmission of the at least one second user terminal.

101. The method of claim 93, wherein the at least one first user terminal generates a first upstream data transmission in at least one fourth upstream time slot, wherein the at least one second user terminal generates a second upstream data transmission in the at least one fourth upstream time slot, and wherein the first upstream data transmission of the at least one first user terminal has a data collision with the second upstream data transmission of the at least one second user terminal.

102. The method of claim 93, wherein the granted burst size is less than the requested burst size.

103. The method of claim 93, wherein a single user terminal of the plurality of user terminals generates a first upstream data transmission as at least part of the first information flow, wherein the single user terminal generates a second upstream data transmission as at least part of at least one second information flow, the at least one second information flow being maintained by the at least one first user terminal, the first information flow and the at least one second information flow both being active and multiplexed over the shared communications medium.

104. The method of claim 103, wherein the first information flow provides a first class of service that is at least one selection from the group consisting of: constant bit rate (CBR), variable bit rate (VBR), available bit rate (ABR), and unspecified bit rate (UBR), and wherein the at least one second information flow provides a second class of service that is at least one selection from the group consisting of: constant bit rate (CBR), variable bit rate (VBR), available bit rate (ABR), and unspecified bit rate (UBR).

105. A method employed in a two way communications system comprising a controller and a plurality of user terminals, the two way communications system capable of carrying information flows and bursts of data of the plurality of user terminals, the controller transmitting downstream information to the plurality of user terminals on at least one downstream channel, the plurality of user terminals transmitting upstream information to the controller on at least one shared upstream channel of a shared communications medium, the bandwidth of the at least one shared upstream channel being divided into upstream time slots, the upstream time slots capable of carrying reservation requests and data, at least one media access control mechanism being used to resolve contention for transmission on the at least one shared upstream channel, an upstream information transmission of at least one first user terminal of the plurality of user terminals capable of colliding on the at least one shared upstream channel with an upstream information transmission of at least one second user terminal of the plurality of user terminals, the method comprising the steps of:

maintaining a first information flow, the first information flow being associated with at least one service parameter, the first information flow having a quality of service indicated by the at least one service parameter;

receiving notice of a first grant from the controller responsive to the controller scheduling of the first grant, the first grant message indicating an allocation of at least one first upstream time slot to carry data that is at least part of the first information flow; and disregarding notice of a second grant from the controller, the notice of the second grant indicating the allocation of a second grant of at least one second upstream time slot to the at least one second user terminal, the second grant generated by the controller responsive to the at least one second user terminal sending a reservation request that solicits the second grant to carry a requested burst of data, the requested burst of data having a requested burst size of finite amount.

106. The method of claim 105, wherein the two way communications system is a cable system.

107. The method of claim 105, wherein the quality of service indicated by the at least one service parameter is used to implement at least one class of service that is at least one selection from the group consisting of: constant bit rate (CBR), variable bit rate (VBR), available bit rate (ABR), and unspecified bit rate (UBR).

108. The method of claim 105, wherein the at least one service parameter is at least one selection from the group consisting of: at least one bit rate, at least one jitter requirement, and at least one transit delay requirement.

109. The method of claim 105, wherein maintaining the first information flow further comprises the steps of:

monitoring at least one message that carries information flow signaling; and modifying a status of the first information flow responsive to the at least one message that carries information flow signaling.

110. The method of claim 105, wherein the upstream time slots comprise a first type of upstream time slots and a second type of upstream time slots, the first type of upstream time slots limited to carrying reservation requests, and the second type of upstream time slots capable of carrying data that is not limited to reservation requests.

111. The method of claim 110, wherein the controller dynamically varies how many of the first type of upstream time slots exist relative to how many of the second type of upstream time slots exist in a specified amount of time.

112. The method of claim 105, wherein the at least one first user terminal generates a first reservation request transmission in at least one third upstream time slot, wherein the at least one second user terminal generates a second reservation request transmission in the at least one third upstream time slot, and wherein the first reservation request transmission of the at least one first user terminal has a reservation request collision with the second reservation request transmission of the at least one second user terminal.

113. The method of claim 105, wherein the at least one first user terminal generates a first upstream data transmission in at least one fourth upstream time slot, wherein the at least one second user terminal generates a second upstream data transmission in the at least one fourth upstream time slot, and wherein the first upstream data transmission of the at least one first user terminal has a data collision with the second upstream data transmission of the at least one second user terminal.

114. The method of claim 105, wherein the granted burst size is less than the requested burst size.

115. The method of claim 105, wherein a single user terminal of the plurality of user terminals generates a first upstream data transmission as at least part of the first information flow, wherein the single user terminal generates a second upstream data transmission as at least part of at least one second information flow, the at least one second information flow being maintained by the at least one first user terminal, the first information flow and the at least one second information flow both being active and multiplexed over the shared communications medium.

116. The method of claim 115, wherein the first information flow provides a first class of service that is at least one selection from the group consisting of: constant bit rate (CBR), variable bit rate (VBR), available bit rate (ABR), and unspecified bit rate (UBR), and wherein the at least one second information flow provides a second class of service that is at least one selection from the group consisting of: constant bit rate (CBR), variable bit rate (VBR), available bit rate (ABR), and unspecified bit rate (LJBR).

*117. A method for scheduling data transmissions, wherein the method is employed in a two-way communications system comprising a controller and a plurality of stations, the two-way communications system capable of carrying information flows and bursts of data of the plurality of stations, the controller transmitting downstream information to the plurality of stations on at least one downstream channel, the plurality of stations transmitting upstream information to the controller on at least one shared upstream channel of the communications medium, the bandwidth of the at least one shared upstream channel being divided into upstream time slots, the upstream time slots capable of carrying reservation requests and data, the method comprising:*

*processing a request for recurring time slots that includes soliciting a first grant of at least one first upstream time slot the at least one shared upstream channel of the communications medium, the at least one shared upstream channel capable of carrying an upstream transmission from a first station, the transmission capable of colliding with an upstream transmission from at least one second station, the time slots for carrying bursts of data having a burst size of finite amount;*

*scheduling a plurality of unsolicited upstream transmission grants comprising a second grant of at least one second upstream timeslot, the scheduling being based at least upon a first entry in a list of at least one information flow and at least one service parameter, the second grant being scheduled to provide a first information flow with a quality of service indicated by the at least one service parameter, the first information flow being associated with the first entry in the list of at least one information flow;*

*sending notice of the first grant to the plurality of stations responsive to the request for recurring time slots, the notice of the first grant indicating an allocation of the at least one first upstream time slot to carry a granted burst of data, the granted burst of data having a granted burst size and comprising a finite amount of data; and*

*sending notice of the second grant to the plurality of stations responsive to the scheduling of the second grant, the notice of the second grant indicating an allocation of the at least one second upstream time slot to carry data that is at least part of the first information flow.*

*118. The method of claim 117, further comprising: sending a response to the request for the recurring time slots.*

*119. The method of claim 117, further comprising: receiving the request for recurring time slots in the upstream channel.*

*120. The method of claim 117, further comprising: maintaining a collection of information flows, the collection of information flows being associated with at least one service parameter.*

*121. The method of claim 117, further comprising: sending the plurality of unsolicited upstream transmission grants, the grants meeting the requested quality of service of the first information flow defined by the at least one service parameter.*

*122. The method of claim 121, further comprising: receiving the bursts of data on the upstream channel responsive to at least one of the plurality of unsolicited grants.*

*123. The method of claim 117, wherein upon determining that additional information in excess of the burst size is required to be sent: processing a supplemental upstream data request.*

*124. The method of claim 123, wherein the supplemental upstream data request is transmitted within a previously scheduled data burst.*

*125. The method of claim 123, further comprising: scheduling at least one supplemental upstream transmission grant responsive to the supplemental upstream data request.*

*126. The method of claim 125, further including: transmitting the at least one supplemental grant responsive to the supplemental upstream data request.*

*127. The method of claim 126, further comprising: receiving at least one supplemental burst of data on the upstream channel responsive to the at least one supplemental grant.*

*128. The method of claim 117, wherein the communications medium is at least part of a cable television networking environment.*

*129. The method of claim 117, wherein the bursts of data are carried in anyone of ATM cells or packets.*

*130. The method of claim 117, wherein the bursts of data comprise anyone of digitized voice or digitized video.*

*131. The method of claim 117, wherein the information flow is from a local area network (LAN).*

*132. A controller in a two-way communications system comprising a controller and a plurality of stations, the two-way communications system capable of carrying information flows and bursts of data of the plurality of stations, the controller transmitting downstream information to the plurality of stations on at least one downstream channel, the plurality of stations transmitting upstream information to the controller on at least one shared upstream channel of the communications medium, the bandwidth of the at least one shared upstream channel being divided into upstream time slots, the upstream time slots capable of carrying reservation requests and data, the controller comprising:*

*logic configured to process a request for recurring time slots that includes soliciting a first grant of at least one first upstream time slot in the at least one shared upstream channel of the communications medium, the at least one shared upstream channel capable of carrying an upstream transmission from a first station, the transmission capable of colliding with an upstream transmission from at least one second station, the time slots for carrying bursts of data having a burst size of finite amount;*

*logic configured to schedule a plurality of unsolicited upstream transmission grants comprising a second grant of at least one second upstream timeslot, the scheduling being based at least upon a first entry in a list of at least one information flow and at least one service parameter, the second grant being scheduled to provide a first information flow with a quality of service indicated by the at least one service parameter, the first information flow being associated with the first entry in the list of at least one information flow;*

*logic configured to send notice of the first grant to the plurality of stations responsive to the request for recurring time slots, the notice of the first grant indicating an allocation of the at least one first upstream time slot to carry a granted burst of data, the granted burst of data having a granted burst size and comprising a finite amount of data; and*

*logic configured to send notice of the second grant to the plurality of stations responsive to the scheduling of a second grant, the notice of the second grant indicating an allocation of the at least one second upstream time slot to carry data that is at least part of the first information flow.*

*133. The controller of claim 132, further comprising: logic configured to send a response to the request for the recurring time slots.*

*134. The controller of claim 132, further comprising: logic configured to receive the request for recurring time slots in the upstream channel.*

*135. The controller of claim 132, further comprising: logic configured to maintain a collection of information flows, the collection of information flows being associated with at least one service parameter.*

*136. The controller of claim 132, further comprising: logic configured to send the plurality of unsolicited upstream transmission grants, the grants meeting the requested quality of service of the first information flow defined by the at least one service parameter.*

*137. The controller of claim 136, further comprising: logic configured to receive the bursts of data on the upstream channel responsive to at least one of the plurality of unsolicited grants.*

*138. The controller of claim 132, further comprising: logic configured to process a supplemental upstream data request upon determining that additional information in excess of the burst size is required to be sent.*

*139. The controller of claim 138, wherein the supplemental upstream data request is transmitted within a previously scheduled data burst.*

*140. The controller of claim 138, further comprising: logic configured to schedule at least one supplemental upstream transmission grant responsive to the supplemental upstream data request.*

*141. The controller of claim 140, further including: logic configured to transmit the at least one supplemental grant responsive to the supplemental upstream data request.*

*142. The controller of claim 141, further including: logic configured to receive at least one supplemental burst of data on the upstream channel responsive to the at least one supplemental grant.*

*143. The controller of claim 132, wherein the communications medium is at least part of a cable television networking environment.*

*144. The controller of claim 132, wherein the bursts of data are carried in ATM cells or packets.*

*145. The controller of claim 132, wherein the bursts of data comprise anyone of digitized voice or digitized video.*

*146. The controller of claim 132, wherein the information flow is from a local area network (LAN).*

* * * * *